(12) United States Patent
Molnar

(10) Patent No.: US 7,535,235 B2
(45) Date of Patent: May 19, 2009

(54) INTEGRATED DIGITAL THERMAL AIR FLOW SENSOR

(75) Inventor: Zoltan Istvan Molnar, Calgary (CA)

(73) Assignee: Fluke Corporation, Everett, WA (US)

( * ) Notice: Subject to any disclaimer, the term of this patent is extended or adjusted under 35 U.S.C. 154(b) by 202 days.

(21) Appl. No.: 11/469,891

(22) Filed: Sep. 4, 2006

(65) Prior Publication Data

US 2008/0121033 A1    May 29, 2008

(51) Int. Cl.
*G01F 1/86* (2006.01)
*G01F 1/00* (2006.01)

(52) U.S. Cl. ............... 324/610; 73/204.14; 73/861.03; 73/861

(58) Field of Classification Search ............. 324/610; 73/204.14, 861.03
See application file for complete search history.

(56) References Cited

U.S. PATENT DOCUMENTS

| 4,669,306 A | 6/1987 | Akiyama et al. |
|---|---|---|
| 4,918,995 A * | 4/1990 | Pearman et al. .......... 73/861.02 |
| 4,934,189 A | 6/1990 | Tanimoto et al. |
| 5,150,611 A | 9/1992 | Kleinhans |
| 5,363,842 A * | 11/1994 | Mishelevich et al. ... 128/200.14 |
| 7,308,824 B2 * | 12/2007 | Trescott et al. ........... 73/204.11 |
| 2004/0100289 A1 | 5/2004 | Lull |

FOREIGN PATENT DOCUMENTS

| EP | 0078427 | 5/1983 |
|---|---|---|
| EP | 220164 A2 * | 4/1987 |
| EP | 1441206 | 7/2004 |

* cited by examiner

*Primary Examiner*—Timothy J Dole
*Assistant Examiner*—John Zhu
(74) *Attorney, Agent, or Firm*—patenttm.us

(57) ABSTRACT

An air flow sensor includes a sensor element and a microcontroller, employing a PWM signal to drive the sensor element. Signals from the sensor element are processed by the microcontroller inside the sensor, resulting in continuous readings of air velocity and air temperature.

18 Claims, 2 Drawing Sheets

INTEGRATED DIGITAL THERMAL AIR FLOW SENSOR

BACKGROUND OF THE INVENTION

This invention relates to measurement of air flow, and more particularly, to a digital air flow sensor.

Air flow sensors in test and measurement instruments typically require that the measurement instrument be calibrated to the individual sensor element. As such, the sensor is not easily changed in a single instrument nor interchangeable among multiple instruments without recalibration. This increases the cost of manufacturing, and also increases the cost of repair and maintenance of an instrument.

Existing air flow sensors include thermal anemometers with an analog interface between the sensor element and the instrument, thermal anemometers with a digital interface between the sensor element and the instrument using an UART interface, and thermal anemometers using an analog control loop to drive the sensor bridge. However, all these existing sensor configurations have the test and measurement instruments are calibrated to the sensors, and the sensors are not interchangeable between measurement instruments without recalibration.

SUMMARY OF THE INVENTION

In accordance with the invention, a stand alone digital air flow sensor is built around a sensor element and a microcontroller. The sensor uses a digitally controlled PWM signal to drive the sensor element. Signals from the sensor element are processed by the microcontroller inside the sensor, resulting in continuous readings of air velocity and air temperature.

The sensor has a digital interface (SPI) that can be easily connected to a measurement instrument.

The digital interface can be changed to different protocols or standards to better accommodate connectivity to the measurement instrument.

The role of a measurement instrument using such a sensor is to read the air velocity and air temperature through the digital interface and present this data via the user interface. If necessary, the measurement instrument may also do some application level data processing.

The sensor is self-contained having a full functional self test, complete signal processing to provide the air velocity reading and all calibration data is suitably stored inside the sensor.

Accordingly, it is an object of the present invention to provide an improved air flow sensor having reduced size.

It is a further object of the present invention to provide an improved air flow sensor having reduced circuit complexity.

It is yet another object of the present invention to provide an improved air flow sensor enabling relatively straightforward digital interface with a test instrument.

Another object of the invention is to provide an air flow sensor that reduces the complexity of the test instrument interfacing therewith by performing all necessary signal processing in the sensor module to provide an actual air velocity reading output without requiring further processing by the test instrument to derive the actual air velocity.

A further object of the invention is to provide an air flow sensor that may be adapted to different air velocity measurement applications by adjusting the onboard processing of the sensor.

It is a further object of the invention to have an air flow sensor that is interchangeable with other sensors and other measurement instruments without requiring recalibration of the measurement instruments.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present invention comprises an air flow sensor module and a measurement instrument that interfaces therewith.

Figure 1:
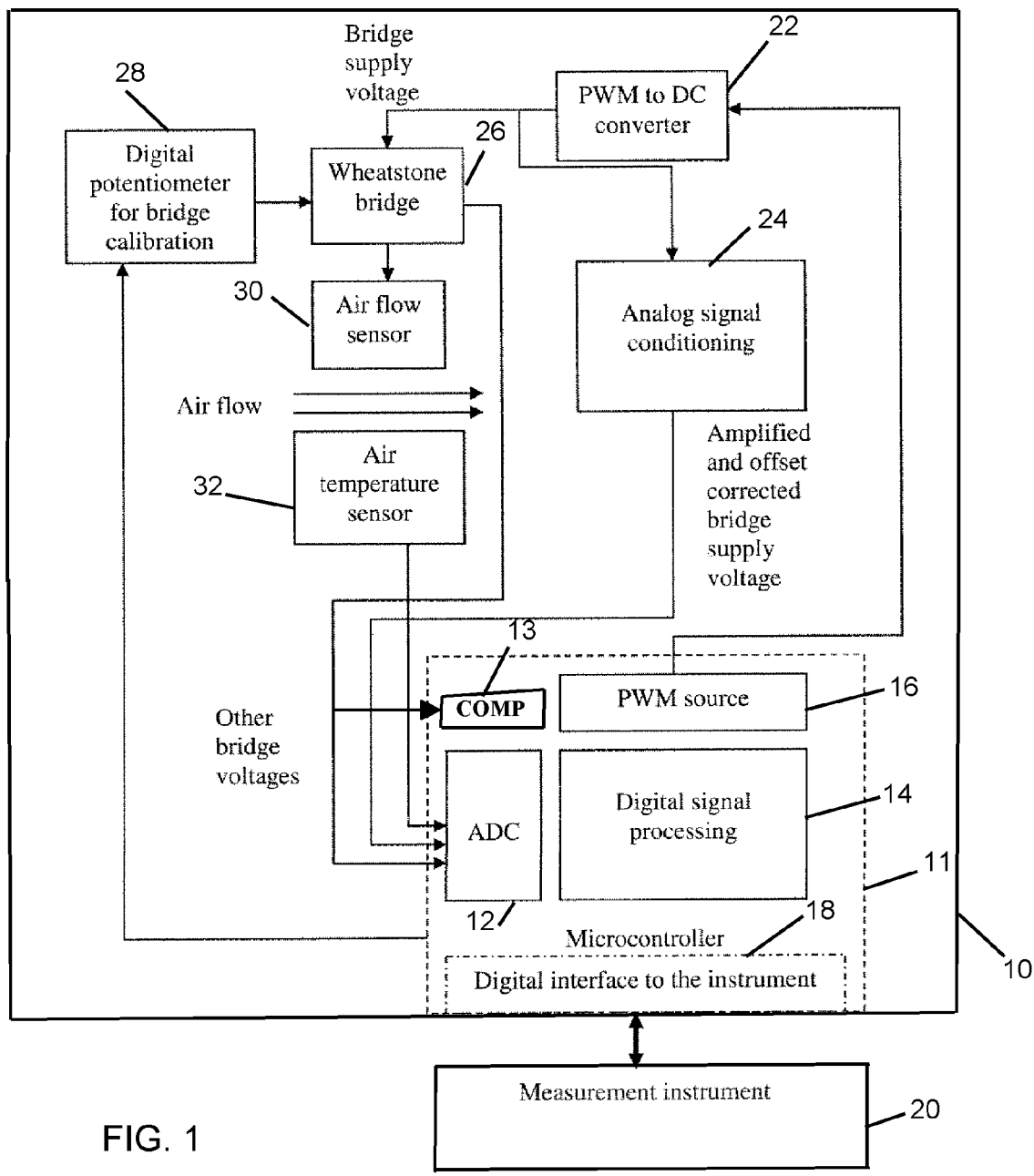
FIG. 1 is a block diagram of an air flow sensor system in accordance with the invention.

Referring to FIG. 1, a block diagram of the system, the air flow sensor module 10 comprises a microcontroller 11, provided with a digital signal processing block 12, a comparator 13, an analog to digital converter (ADC) block 14, a pulse width modulation (PWM) source 16 and a digital interface 18, which interfaces with measurement instrument 20.

PWM source 16 supplies signal to a PWM to DC converter block 22, the output thereof being supplied to analog signal conditioning block 24 and also to a Wheatstone bridge 26 as a bridge supply voltage. Output from analog signal conditioning block 24 is supplied as an input to ADC 12 in the microcontroller.

The microcontroller 11 supplies a signal to a digital potentiometer 28, which inputs to Wheatstone bridge 26. Output from Wheatstone bridge 26 is provided as input to comparator 13 in the microcontroller and also to an air flow sensor 30. Air temperature sensor block 32 provides a signal input to ADC 12 (as does Wheatstone bridge 26).

In operation, the sensor element 30 is supplied voltage by Wheatstone bridge 26, and that supply voltage from the Wheatstone bridge is received by the microcontroller comparator 13. These readings are then used to control the duty cycle of the signal generated by PWM source 16. The Wheatstone bridge supply voltage is proportional with the air flow velocity across the sensor element, and this value as fed to comparator 13 is converted to an air velocity reading. The temperature sensor also provides a temperature reading of the air flow. These measured values may then be provided to the measurement instrument 20 via the digital interface 18.

The air flow sensor operating is based on wind chill factor principles, wherein a sensor element body is heated to a fixed temperature, and exposed to the air velocity. The amount of energy required to maintain the sensor element body at the fixed temperature provides an indication of air speed, where higher air speed will required more energy to maintain the temperature of the sensor body.

Since at zero air velocity, the bridge supply voltage will have a non-zero voltage output, analog signal conditioning block 24 receives the bridge supply voltage from PWM to DC converter 22 and performs an offset adjustment to compensate for the zero value so that the maximum ADC range will be available for measurement determinations. Also, the voltage value may be amplified by block 24.

The bridge supply voltage operation is now described. The airflow sensor is connected to the Wheatstone bridge, which is kept in balance by modifying the bridge supply voltage, as monitored by the microcontroller via the input to comparator 13. The state of the Wheatstone bridge is monitored by the microcontroller via the controller 13, to achieve a higher resolution or sensitivity that would be achievable by using the DAC provided on the microcontroller. The bridge supply voltage is a result of block 22 DC filtering the PWM signal generated by the microcontroller. A PID loop controls the voltage by adjusting the PWM duty cycle based on the output state of the comparator. In a preferred embodiment, the PWM signal has a base frequency of 8 kHz.

Figure 2:
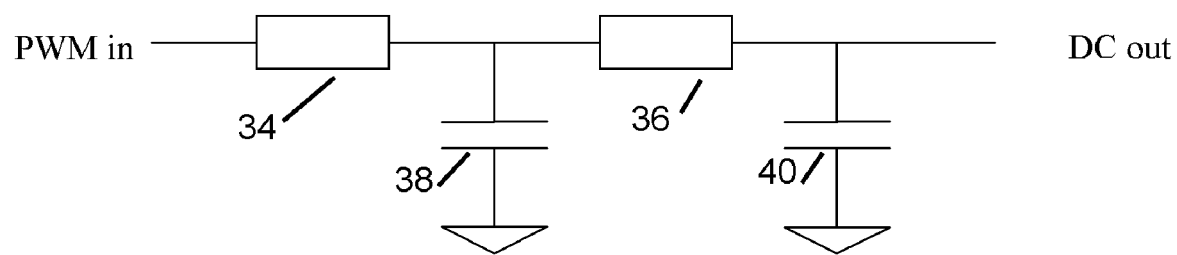
FIG. 2 is a diagram of the PWM to DC block.

FIG. 2 illustrates the PWM to DC converter 22 in more detail. The PWM signal from the PWM source 16 is filtered to DC by a two stage RC low-pass filter. The filter comprises resistors 34 and 36 in series between the input from PWM source 16 and output to the Wheatstone bridge, with capacitor 40 connected between ground and the junction of resistors 34 and 36, and capacitor 42 connected between ground and the end of resistor 36 distal from resistor 34.

Unlike prior art control loops which employ difference amplifiers to measure how much out of balance a bridge would be, in operation of the present system, the comparator 13 is used to monitor the bridge voltage. In the illustrated embodiment, the comparator state is sampled every 50 ms. If the current sampled state of the comparator is the same as the previous state, then a state counter is incremented toward a positive (or negative) value. When the comparator state changes, the state counter is reset.

The PWM duty cycle is controlled with a PID loop. The error measure for the PID loop "e" (input parameter) is the comparator state counter. The ideal value for the PID setpoint, "Gd" is 0.

The error can be measured as the difference between the output and the desired output:

$$e(t) = Gd - G(t)$$

where Gd is the desired setpoint
G(t) is the actual measurement

Output correction of the PID controller is $$x(t) = KPe(t) + KI \int e(t) + KD \frac{de(t)}{dt} \bigg| t = T$$

$$x(t) = KPe(t) + KI \int_{t=0}^{t} [Gd - G(t)] dt + KD \frac{de(t)}{dt} \bigg| t = T$$

Where T is the comparator sampling and PWM update period.

To transform to discrete form, let t=kT where k=1, 2, . . . , n.

The integral evaluated from (k−1)T to kT can be approximated using the trapezoidal integration rule. The derivative of the error term is the rate of change of error, but this can be noisy over one period. Using a four-point central-weighted average for the difference term is a practical way to deal with the noise.

The discrete time form of the PID correction is:

$$x(t) = KPe(t) + KI\left(Gdt - \frac{T}{2}(G(Kt) + G[(k-1)T])\right) +$$

-continued
$$\frac{KD}{6T}((e(kT) - e(k-3) + 3(e(k-1) - e(k-2))))$$

When a system with only proportional control is off the specified set point, the controller will increase the control voltage until the error signal is zero, and the system thus returns to the set point with more applied voltage than is required for maintaining equilibrium. This causes overshoot and, as the process continues, under-damped ringing. A system that has a steady state error when tracking a ramping input function can use an integral term to integrate the error over time and compensate for it.

The PWM duty cycle is computed as:

$$PWM(t) = PWM(t-1) + x(t)$$

In steady state, the biggest contribution to the PID output noise is the noise introduced by the proportional component. Accordingly, to ensure minimal PID steady state noise, an attenuated proportional gain is used which will be high if the error is high and low if the error is under a preset value.

Sampling of air flow and air temperature signals are made via ADC 12, suitably at 120 ms timing in the preferred embodiment.

The sensor outputs standard air flow velocity in meters per second [m/s] as well as air flow temperature in [C].

The measurement instrument 20 includes an onboard barometric pressure meter. For the standard air flow to actual air flow conversion it is presumed that the barometric pressure measured by the instrument 20 is the same as the pressure where the air flow is measured.

The instrument converts standard air velocity to actual air velocity using the following formula:

$$V_{actual} = V_{standard} * ((273 + T_m)/(273 + T_{NIST})) * (P_{NIST}/P_m)$$

$T_m$ = Measured ambient temperature in degrees Centigrade
$P_m$ = Measured ambient pressure in kPa The NIST defined standard conditions are $T_{NIST}$=20.0 C and $P_{NIST}$=101.325 kPa.

The measurement instrument suitably includes a display and user interface to accept user commands for operation thereof. Power supply and operational controls are also provided. The instrument may be constructed to receive the air flow sensor module 10 as a removable plug-in measurement module, whereby the functionality of the instrument can be changed to measure other phenomena by changing to a different plug-in module.

The sensor of the preferred embodiment suitably has an air velocity measurement range of 0 to 15 meters/second and a temperature range of −200 to 60° C. The voltage output range is 0 to 5V. An example of a suitable sensor is an FS1 air flow sensor marketed by IST AG of Wattwil, Switzerland.

The temperature sensor is suitably based on a Fairchild FM50 analog temperature sensor.

Thus, in accordance with the invention, an improved thermal air flow sensor is provided.

While a preferred embodiment of the present invention has been shown and described, it will be apparent to those skilled in the art that many changes and modifications may be made without departing from the invention in its broader aspects.

The appended claims are therefore intended to cover all such changes and modifications as fall within the true spirit and scope of the invention.

What is claimed is:

1. An air flow measurement device, comprising:
   an air flow sensor;
   a comparator monitoring voltage relative to the sensor;
   a controller for sampling the state of the comparator, and determining air flow detected by the sensor based therefrom;
   a bridge circuit supplying voltage to said air flow sensor, wherein said comparator monitors voltage of said bridge circuit;
   comprising a PWM driver circuit, wherein said bridge circuit is supplied voltage via said PWM driver circuit; and
   a PWM to DC circuit between said bridge circuit and said PWM driver circuit, for converting output of said PWM circuit to a substantially DC output.

2. The air flow measurement device according to claim 1, wherein said controller samples the state of the comparator at substantially 50 ms intervals.

3. The air flow measurement device according to claim 1, wherein said bridge comprises a Wheatstone bridge.

4. An air flow measurement device, comprising:
   an air flow sensor;
   a comparator monitoring voltage relative to the sensor; and
   a controller for sampling the state of the comparator, and determining air flow detected by the sensor based therefrom,
   wherein said controller employs a state counter and wherein if a current state of said comparator is the same as a previous state, the state counter is incremented and wherein if the current state of said comparator is the different from as the previous state, the state counter is reset.

5. The air flow measurement device according to claim 4, wherein said controller samples the state of the comparator at substantially 50 ms intervals.

6. The air flow measurement device according to claim 4, comprising a bridge circuit supplying voltage to said air flow sensor, wherein said comparator monitors voltage of said bridge circuit.

7. The air flow measurement device according to claim 6, wherein said bridge comprises a Wheatstone bridge.

8. The air flow measurement device according to claim 6, comprising a PWM driver circuit, wherein said bridge circuit is supplied voltage via said PWM driver circuit.

9. The air flow measurement device according to claim 4, wherein said state counter is employed as an error measure "e" in a PID controller, $$x(t) = KPe(t) + KI\left(Gdt - \frac{T}{2}(G(Kt) + G[(k-1)T])\right) + \frac{KD}{6T}((e(kT) - e(k-3) + 3(e(k-1) - e(k-2)))$$

where e(t)=Gd−G(t), where Gd is a desired setpoint, G(t) is an actual measurement, k is an integer.

10. A method of operating an air flow measurement device, comprising:
    providing an air flow sensor;
    providing a comparator for monitoring voltage relative to the sensor;
    providing a controller for sampling the state of the comparator, and determining air flow detected by the sensor based therefrom;
    providing a bridge circuit for supplying voltage to said air flow sensor, and employing said comparator for monitoring voltage of said bridge circuit;
    providing a PWM driver circuit, wherein said bridge circuit is supplied voltage via said PWM driver circuit; and
    providing a PWM to DC circuit between said bridge circuit and said PWM driver circuit, for converting output of said PWM circuit to a substantially DC output.

11. The method according to claim 10, comprising sampling the state of the comparator at substantially 50 ms intervals.

12. The method according to claim 10 wherein said bridge comprises a Wheatstone bridge.

13. A method of operating an air flow measurement device, comprising:
    providing an air flow sensor;
    providing a comparator for monitoring voltage relative to the sensor;
    providing a controller for sampling the state of the comparator, and determining air flow detected by the sensor based therefrom; and
    employing said controller to employ a state counter and wherein if a current state of said comparator is the same as a previous state, the state counter is incremented and wherein if the current state of said comparator is the different from as the previous state, the state counter is reset.

14. The method according to claim 13, comprising sampling the state of the comparator at substantially 50 ms intervals.

15. The method according to claim 14, wherein said bridge comprises a Wheatstone bridge.

16. The method according to claim 13, comprising a providing a bridge circuit for supplying voltage to said air flow sensor, and employing said comparator for monitoring voltage of said bridge circuit.

17. The method according to claim 16, comprising providing a PWM driver circuit, wherein said bridge circuit is supplied voltage via said PWM driver circuit.

18. The method according to claim 13, further comprising employing said state counter is employed as an error measure "e" in a PID controller, $$x(t) = KPe(t) + KI\left(Gdt - \frac{T}{2}(G(Kt) + G[(k-1)T])\right) + \frac{KD}{6T}((e(kT) - e(k-3) + 3(e(k-1) - e(k-2)))$$

where e(t)=Gd−G(t), where Gd is a desired setpoint, G(t) is an actual measurement, k is an integer.

* * * * *